(12) United States Patent
Kraus et al.

(10) Patent No.: US 6,425,937 B1
(45) Date of Patent: Jul. 30, 2002

(54) PROCESS FOR PURIFYING AIR BY ADSORPTION OVER A BARIUM-EXCHANGED ZEOLITE

(75) Inventors: Georges Kraus; Cyrille Millet, both of Paris; Serge Moreau, Velizy Villacoublay; Jean-Pierre Gabillard, Auffargis, all of (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 22 days.

(21) Appl. No.: 09/609,370

(22) Filed: Jul. 3, 2000

(30) Foreign Application Priority Data

Jul. 2, 1999 (FR) .............................. 99 08566

(51) Int. Cl.$^7$ .............................. B01D 53/04
(52) U.S. Cl. ............. 95/90; 95/95; 95/96; 95/104; 95/117; 95/129; 95/139; 95/143; 95/144; 95/148; 95/902
(58) Field of Search .............. 95/95, 96, 97, 95/102, 104, 106, 115, 117, 121, 126, 128, 129, 139, 143, 144, 145, 148, 902; 96/108, 121; 502/64, 79, 411, 414; 423/713, 714, 715, 328.2, DIG. 21

(56) References Cited

U.S. PATENT DOCUMENTS

| | | | |
|---|---|---|---|
| 2,882,244 A | * 4/1959 | Milton | 423/718 |
| 3,808,773 A | * 5/1974 | Reyhing et al. | 95/104 |
| 3,885,927 A | 5/1975 | Sherman et al. | |
| 4,247,987 A | * 2/1981 | Coulaloglou et al. | 95/108 |
| 4,765,808 A | * 8/1988 | Oigo et al. | 95/902 |
| 4,935,580 A | * 6/1990 | Chao et al. | 95/139 |
| 4,957,514 A | * 9/1990 | Golden et al. | 95/143 |
| 5,110,569 A | * 5/1992 | Jain | 95/97 |
| 5,424,051 A | * 6/1995 | Nagji et al. | 95/139 |
| 5,980,611 A | * 11/1999 | Kumar et al. | 95/102 |
| 6,074,973 A | * 6/2000 | Lampert et al. | 95/902 |
| 6,106,593 A | * 8/2000 | Golden et al. | 95/129 |
| 6,143,057 A | * 11/2000 | Büulow et al. | 95/96 |
| 6,270,557 B1 | * 8/2001 | Millet et al. | 95/96 |
| 6,273,939 B1 | * 8/2001 | Milet et al. | 95/106 |

FOREIGN PATENT DOCUMENTS

| | | |
|---|---|---|
| EP | 0 284 850 A2 * | 10/1988 |
| EP | 0 591 919 A1 | 4/1994 |
| JP | 61-191516 | 8/1986 |

* cited by examiner

Primary Examiner—Duane Smith
Assistant Examiner—Jason M. Greene
(74) Attorney, Agent, or Firm—Young & Thompson

(57) ABSTRACT

A process for purifying a gas stream containing at least one impurity chosen from the group formed by propane, nitrogen protoxide and ethylene, in which process:

(a) the gas stream to be purified is brought into contact with at least one adsorbent including at least one X zeolite containing barium cations;

(b) at least one impurity is adsorbed on the adsorbent. Preferably, the adsorbent includes particles of X zeolite exchanged to at least 70%, preferably at least 89%, with barium cations, it being possible for the adsorbent to furthermore include a bed of activated alumina particles which is located upstream of the bed of barium-exchanged X zeolite.

17 Claims, 4 Drawing Sheets

PROCESS FOR PURIFYING AIR BY ADSORPTION OVER A BARIUM-EXCHANGED ZEOLITE

FILED OF THE INVENTION

The object of the present invention is to provide a process for pretreating or purifying a gas stream consisting of atmospheric air prior to the cryogenic separation of the air, particularly by cryogenic distillation.

BACKGROUND OF THE INVENTION

It is known that atmospheric air contains compounds that have to be removed before the air is introduced into the heat exchangers of the cold box of an air separation unit, especially the compounds carbon dioxide ($CO_2$), water vapour ($H_2O$) and/or hydrocarbons (CnHm) for example.

This is because, in the absence of such an air pretreatment for removing its $CO_2$ and water vapour impurities, these impurities condense and solidify as ice when the air is cooled to cryogenic temperature, which may result in problems of the equipment, especially the heat exchangers, distillation columns, etc., becoming blocked.

Furthermore, it is also common practice to remove the hydrocarbon impurities liable to be present in the air so as to avoid any risk of deterioration of the equipment, particularly of the distillation column or columns located downstream of the cold box.

At the present time, this air pretreatment is carried out, depending on the case, by a TSA (Temperature Swing Adsorption) process or by a PSA (Pressure Swing Adsorption) process; the expression "PSA process" should be understood to mean actual PSA processes, VSA (Vacuum Swing Adsorption) processes, VPSA (Vacuum Pressure Swing Adsorption) processes and similar processes.

Conventionally, a TSA process cycle for purifying air comprises the following steps:

a) purification of the air by adsorption of the impurities at a superatmospheric pressure and at ambient temperature;

b) depressurization of the adsorber down to atmospheric pressure or below atmospheric pressure;

c) regeneration of the adsorbent at atmospheric pressure, especially by residual gases or waste gases, typically impure nitrogen coming from an air separation unit and heated to a temperature above +80° C. by means of one or more heat exchangers;

d) cooling of the adsorbent to ambient or subambient temperature, especially by continuing to introduce therein to the waste gas coming from the air separation unit, but the gas not being heated;

e) repressurization of the adsorber with purified air coming, for example, from another adsorber which is in production phase.

As regards a PSA process cycle for purifying air, this usually comprises substantially the same steps a), b) and e), but differs from a TSA process by the absence of a step for heating the waste gas or gases during the regeneration step (step c)), and therefore the absence of step d), and, in general, a shorter cycle time than in the TSA process.

In general, air pretreatment devices comprise two adsorbers, operating alternately, that is to say one of the adsorbers is in production phase while the other is in regeneration phase.

Such TSA air purification processes are especially described in U.S. Pat. No. 3,738,084 and FR-A-77/25845.

In general, the removal of the $CO_2$ and the water vapour is carried out over one or more beds of adsorbents, preferably several beds of adsorbents, namely generally a first adsorbent designed to preferentially stop the water, for example a bed of activated alumina, of silica gel or of zeolites, and a second bed of adsorbent for preferentially stopping the $CO_2$, for example a zeolite. In this regard, mention may especially be made of documents U.S. Pat. No. 5,531,808, U.S. Pat. No. 5,587,003 and U.S. Pat. No. 4,233,038.

However, it is not an easy matter to achieve effective removal of the $CO_2$ and water vapour which are contained in the air over one and the same bed of adsorbent since water has an affinity for the adsorbents which is markedly greater than that of $CO_2$, and it is therefore customary to use at least two beds or layers of adsorbents of different types.

Thus, it is common practice to use a zeolite of the 13X type for removing the $CO_2$ since the 13X zeolite is reputed to be particularly effective for stopping small amounts of $CO_2$ and possibly of water, as it has a strong affinity and selectivity for these polar molecules. In addition, the X zeolite has among the largest micropore diameters, enabling it to adsorb, with favourable kinetics, molecules having a kinetic diameter up to 0.8 nm, as mentioned by D.W. Breck's document "Zeolite molecular sieves", Krieger Publishing Company, 1984, p. 612.

However, the 13X zeolite is unable to stop all undesirable molecules liable to be present in a gas stream.

This is because the gas molecules adsorbed by the 13X zeolite are essentially, and in increasing affinity: methane, ethane, propane, nitrogen protoxide, ethylene, carbon dioxide, butane, propylene ($C_3H_6$), acetylene ($C_2H_2$), toluene and methylcyclohexane.

In this regard, reference may be made to the following documents: E. Alpay, "Adsorption parameters for strongly adsorbed hydrocarbon vapours on some commercial adsorbents", Gas Sep. & Purif., Vol. 10, No. 1, pp 25 (1996); G. Calleja, "Multicomponent adsorption equilibrium of ethylene, propane, propylene and $CO_2$ on 13X zeolite", Gas Sep. & Purif., Vol. 8, No. 4, p. 247 (1994); V. R. Choudhary, "Sorption isotherms of methane, ethane, ethene and carbon dioxide on NaX, NaY and Na-mordenite Zeolites", J. Chem. Soc. Faraday Trans., 91(17), p. 2935 (1995); and A. Cointot, P. Cartaud, C. Clavaud, "Etude de l'adsorption du protoxyde d'azote par différents tamis moléculaires [Study of the adsorption of nitrogen protoxide by various molecular sieves]", Journal de Chimie Physique, Vol. 71, No. 5, p. 765–770 (1974).

It therefore follows that an industrial air-prepurification unit strictly dimensioned for stopping carbon dioxide with a standard zeolite, typically a 13X or 5A zeolite, only partially stops ethylene, propane and nitrogen protoxide, as indicated by Dr J. Reyhing's document "Removing hydrocarbons from the process air of air separation plants using molecular-sieve adsorbers", Linde Reports on Science and Technology, 36/1983.

Similarly, this situation for hydrocarbons is also described by Dr J. Reyhing in the above document.

Likewise, with regard to nitrogen protoxide, the ineffectiveness of the 5A zeolite for stopping $N_2O$ compared with $CO_2$ has been demonstrated by U. Wenning in "Nitrous oxide in air separation plants", MUST'96, Munich Meeting on Air Separation Technology, Oct. 10–11, 1996.

Moreover, there are also similar problems with ethylene, which is an unsaturated hydrocarbon unstable in the presence of oxygen, soluble in liquid oxygen to a level of 30,000 ppm with a low solute-gas equilibrium coefficient, its freezing point being −169° C., whereas that of liquid oxygen at 1.2 bar is −181° C.

It may therefore be readily understood that, if the prepurification plant does not completely stop the ethylene, it may easily be found downstream of this plant and damage to the cryogenic distillation plant, particularly the distillation columns and/or reboilers, may then result therefrom, something which is unacceptable.

Similar problems may also arise with ethane and propane which may be found in the liquid state at the liquid oxygen temperature at a pressure of 1.2 bar.

Although certain documents provide more or less effective solutions allowing some of the impurities that may be found in a stream of atmospheric air to be removed, the problem of effective removal, that is to say complete stoppage of propane, ethylene and/or nitrogen protoxide which are contained in a gas stream, particularly an air stream, has not yet been solved.

Indeed, document EP-A-847,792 provides a process for adsorbing acetylene impurities and $C_3$–$C_8$ hydrocarbons, in a PSA cycle, no matter whether a CaX, CaA, 5A, 13X or Na-mordenite zeolite is used. However, it should be emphasized that this type of adsorbent gives, overall, results that are less satisfactory than an activated-alumina/NaY double bed.

Moreover, documents EP-A-766,991 and EP-A-453,202 propose the use of standard activated alumina or activated alumina which is thoroughly treated for better air purification by a PSA process. However, the impurities mentioned are only water and $CO_2$.

Furthermore, documents U.S. Pat. No. 5,587,003 and U.S. Pat. No. 5,531,808 describe the use of clinoptilolite or LSX zeolites for stopping carbon dioxide in a stream of atmospheric air and at an ambient temperature up to 80° C. The choice of cations used is extremely wide, namely Groups I, II and IIA, as well as Group IIIB, but no indication is given as regards the possible influence of a particular choice of ions for stopping impurities other than $CO_2$.

Similarly, several documents describe stopping ethylene or nitrogen protoxide by zeolitic adsorbents.

Thus, document DD-A-6225345 describes the use of activated charcoal and of a CaA zeolite for purifying the atmosphere of chambers for preserving fruits and vegetables. This is because the decomposition of plant matter releases ethylene which has to be extracted in order to extend its period of preservation.

Other articles describe stopping nitrogen protoxide by the 5A zeolite.

Thus, mention may be made of the document by F. Mayinger and R. Eggert-Steger "Experimentelle und theorische Untersuchungen zur Koadsorption von $CO_2$ und $N_2O$ am Molekularsieb 5A [Experimental and theoretical investigations on coadsorption of $CO_2$ and $N_2O$ on 5A molecular sieve]", Vol. 27, No. 7, pp. 405–412, 1992, in which it is specified that the $N_2O$ adsorptivity of the 5A zeolite is less than its $CO_2$ adsorptivity.

Document SU-A-1,357,053 teaches the use of Ba-mordenite rather than 5A zeolite for removing nitrogen protoxide, the regeneration being carried out above 180° C.

Mention may also be made of the document, by S.D. Kovalev, S.E. Starobinets, R.G. Kefer and I.S. Puzanov, "Caractéristiques statiques et dynamiques de l'adsorption du protoxyde et de l'oxyde d'azote sur des sorbants résistants aux acides [Static and dynamic characteristics of protoxide adsorption and nitrogen oxide on acid-resistant sorbents]", Vol. 1, pp. 38–41, 1982, in which it is shown that H-mordenite has a useful $N_2O$ adsorptivity but has, on the other hand, a very low adsorptivity for carbon dioxide.

The document, by O. M. Dzhigit, A. V. Kieselev, T. A. Rachmanova and S. P. Zhanov, "Influence of $Li^+$, $Na^-$ and $K^+$ Cation Concentrations in X and Y Zeolites on Isotherms and Heat of Adsorption of Propane and Water", Journal of the Chemical Society, Faraday Transactions, 1979, describes the adsorption of propane on X and Y zeolite as a function of the cation used: the cations are $Li^+$, $Na^+$ and $K^-$.

Furthermore, document EP-A-294,588 teaches the use of a zeolite with strontium cations for stopping the $CO_2$ in air.

Stopping the $CO_2$ of a gas stream on BaX is described in document U.S. Pat. No. 3,885,927.

However, these two publications do not mention stopping $N_2O$, $C_3H_8$ or $C_2H_4$.

To summarize, it seems that the problem of removing propane, ethylene and/or propylene impurities liable to be present in a gas stream, particularly a stream of air, has not been solved satisfactorily up until now.

SUMMARY OF THE INVENTION

The object of the present invention is therefore to solve the above problem, that is to say to provide an adsorption process for purifying a gas stream containing propane, ethylene and/or nitrogen protoxide impurities and, possibly, carbon dioxide and/or water vapour impurities liable to be present in this gas stream.

In other words, the object of the invention is not to propose an adsorbent suitable for optimally stopping $N_2O$, $C_2H_4$ and/or $C_3H_8$, but to propose an adsorbent which does stop any $CO_2$ possibly present as well as a 13X (NaX) zeolite does and to stop completely, upon $CO_2$ breakthrough, the $C_3H_8$, $C_2H_4$ and $N_2O$ type impurities, contrary to what may be obtained by means of a 13X zeolite which is not the most suitable zeolite for completely stopping, simultaneously, the carbon dioxide, propane, ethylene and/or nitrogen protoxide in a gas stream, such as a stream of atmospheric air.

The invention therefore relates to a process for purifying a gas stream containing at least one impurity chosen from the group formed by propane, nitrogen protoxide and ethylene, in which process:

(a) the gas stream to be purified is brought into contact with at least one adsorbent comprising at least one X zeolite containing barium cations;

(b) at least one impurity is adsorbed on the adsorbent.

Depending on the case, the process of the invention may comprise one or more of the following characteristics:

the X zeolite contains at least 30% of barium cations, preferably at least 70% of barium cations and even more preferably from 75 to 98% of barium cations;

the X zeolite has a pore size ranging between 4 and 10 Å, preferably between 5 and 8 Å;

the zeolite furthermore contains at least one cation of Group IA or IIA, preferably potassium, lithium, calcium, strontium, magnesium and/or sodium cations;

the zeolite has an Si/Al ratio ranging between 1 and 1.40, preferably ranging between 1 and 1.15, preferably about 1;

the stream of gas is an air stream;

the gas stream to be purified furthermore contains at least one impurity chosen from carbon dioxide and water vapour;

at least one impurity chosen from carbon dioxide and water vapour is furthermore adsorbed and preferably carbon dioxide is adsorbed on the X zeolite containing barium cations;

the gas stream is at a temperature ranging between −40° C. and +80° C.;

the adsorption pressure ranges between about 3 bar and 40 bar, preferably between 5 bar and 25 bar;

the desorption pressure ranges between about 0.5 bar and 6 bar, preferably between 1 bar and 1.4 bar;

the flow rate of the gas stream ranges between 1 and $10^6$ $Sm^3/h$, preferably between $10^4$ and $5\times10^5$ $Sm^3/h$;

it is of the PSA or TSA, preferably TSA, type;

the regeneration temperature ranges between 80° C. and 400° C., preferably between 100° C. and 250° C.;

at least a portion of the gas stream stripped of at least some of the impurities is subjected to at least one cryogenic distillation step.

The invention also relates to an adsorbent containing an X-type zeolite having a Si/Al ratio ranging between approximately 1 and approximately 1.25 and containing from 10 to 98% of barium cations and from 2 to 90% of sodium and/or potassium cations, the sum of the barium and potassium and/or sodium cations present in the zeolite representing at least 50% of all of the exchangeable cations.

Preferably, the adsorbent has a Si/Al ratio of about 1.

Advantageously, the adsorbent contains from 70 to 96% of barium cations, the rest of the exchangeable sites being occupied by sodium and/or potassium. cations.

BRIEF DESCRIPTION OF THE DRAWINGS

The invention will now be described in greater detail, with reference to the appended figures which are given by way of illustration but imply no limitation.

DETAILED DESCRIPTION OF THE INVENTION

Figure 1:
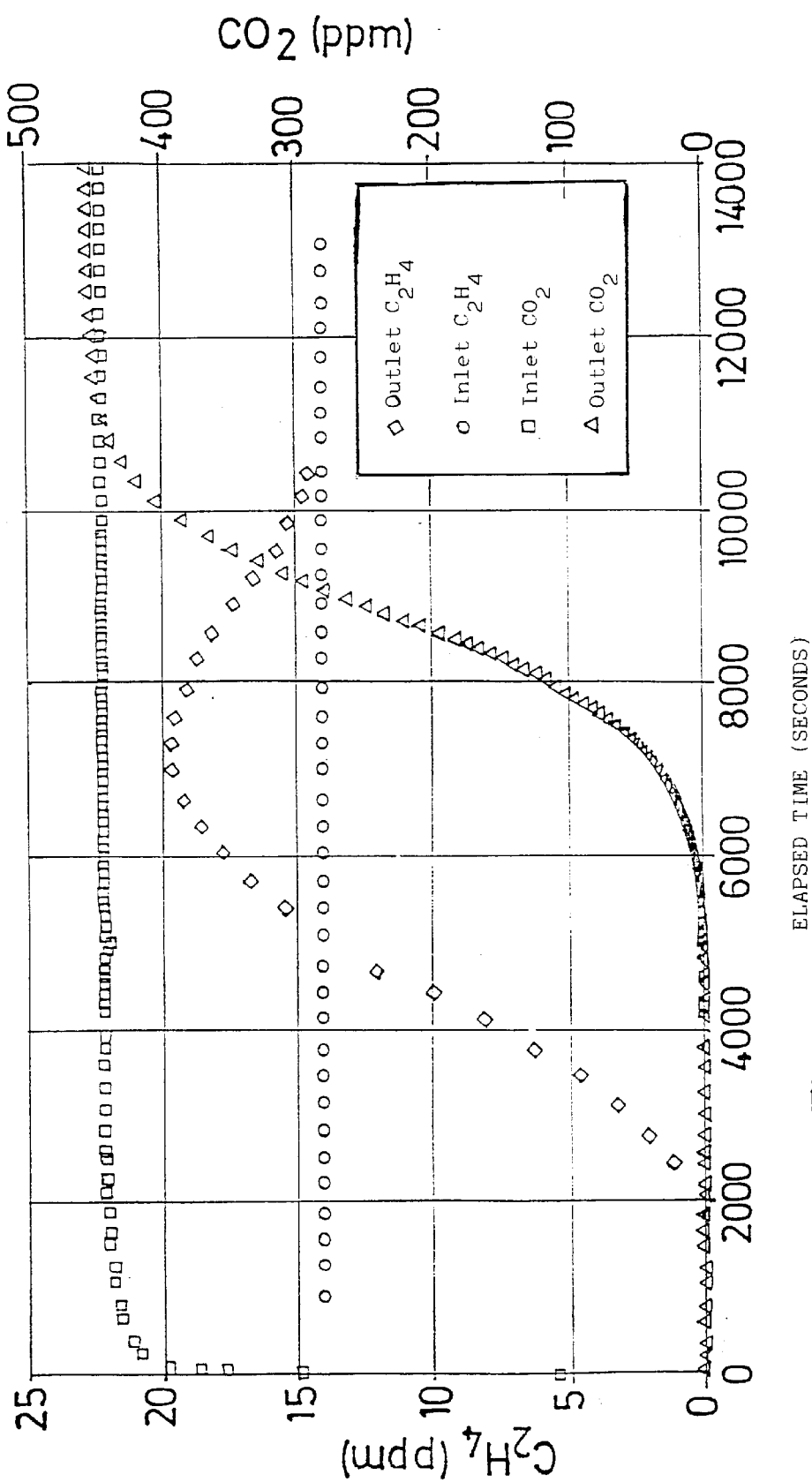
Figure 2:
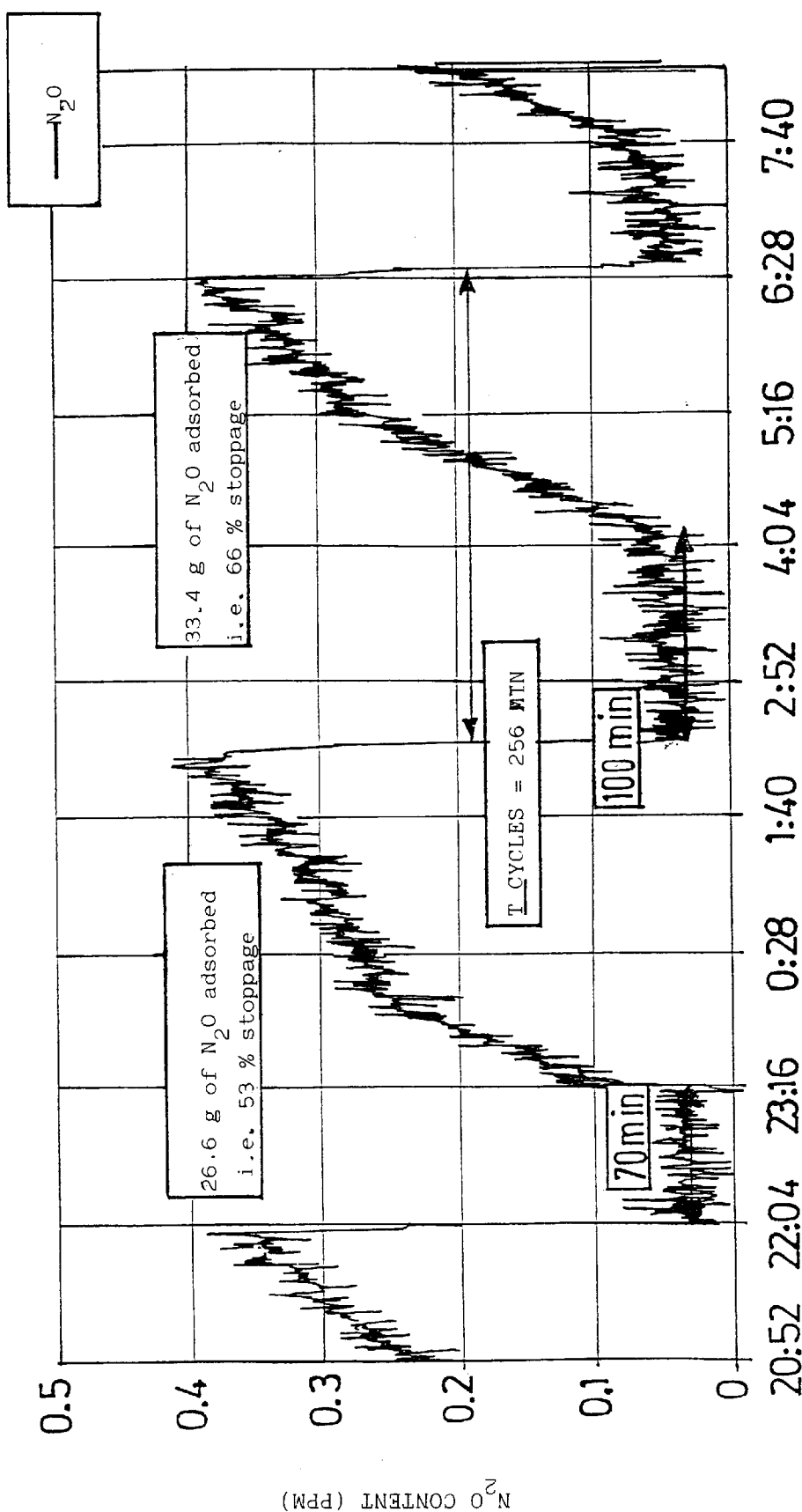
Figure 3:
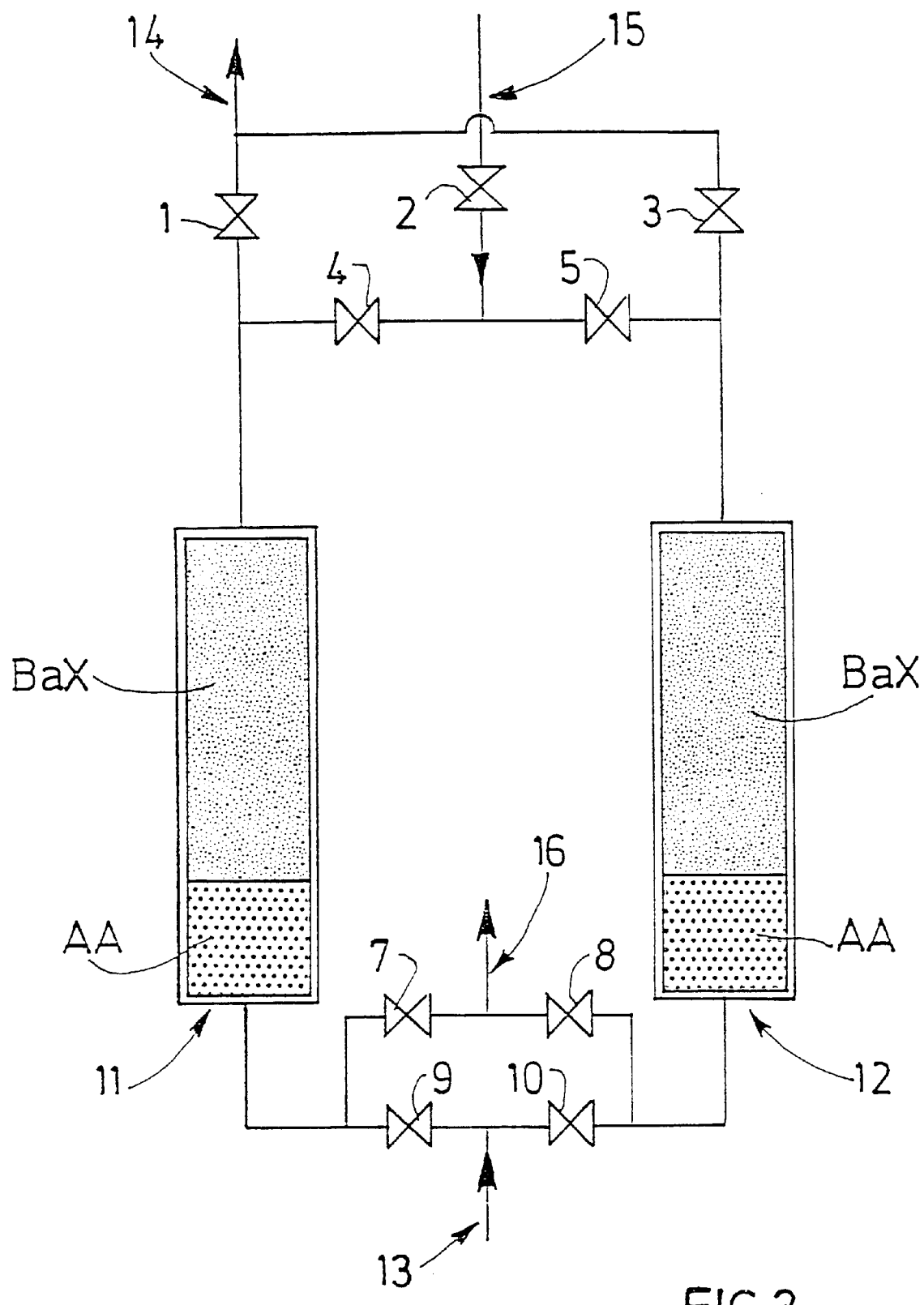
Figure 4:
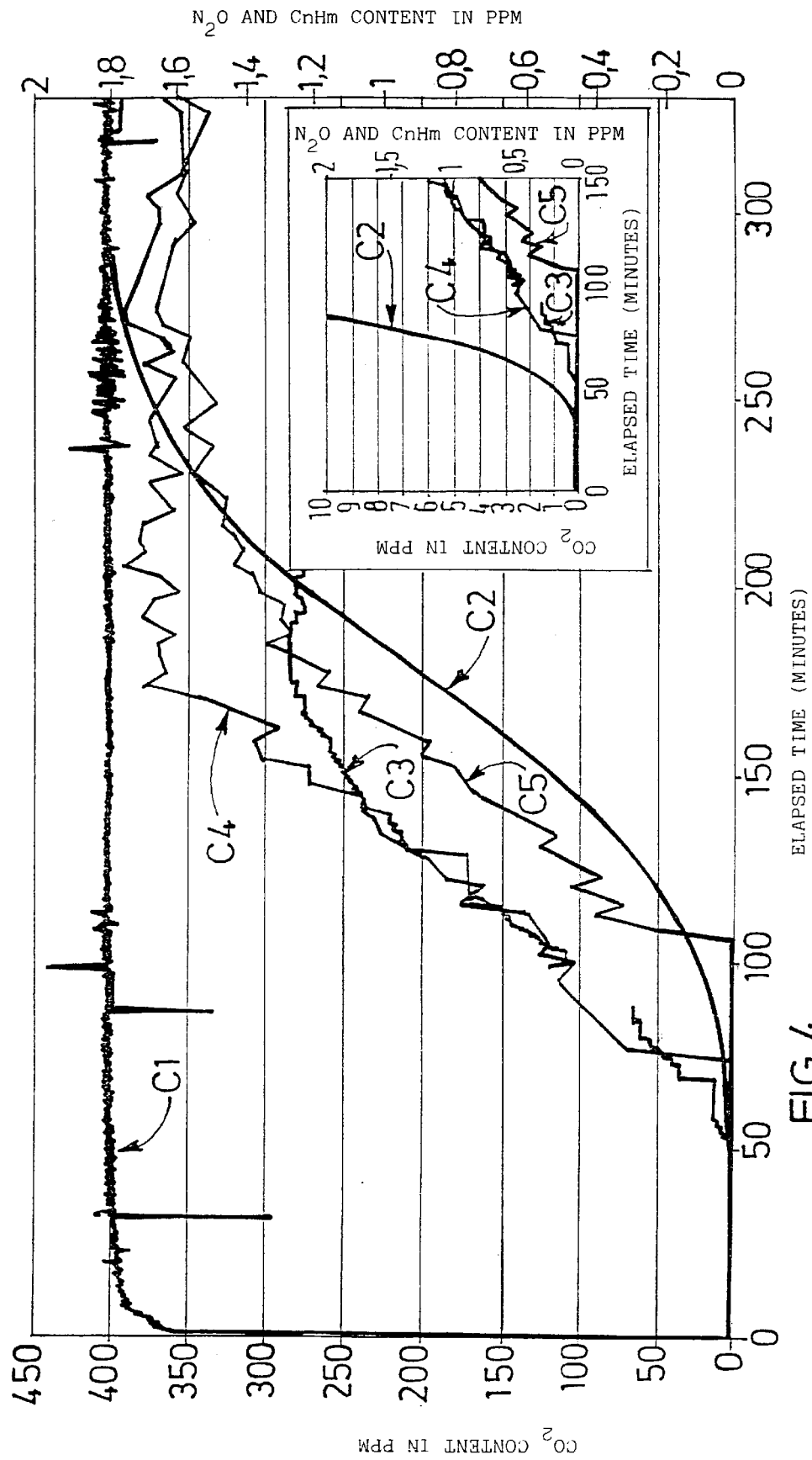

FIG. 1 shows the simultaneous breakthrough curves for ethylene and $CO_2$ obtained on a conventional 13X zeolite bed;

FIG. 2 shows the nitrogen protoxide breakthrough curve on an industrial air separation unit;

FIG. 3 depicts the adsorption device used in a process according to the invention; and FIG. 4 shows the propane, ethylene, nitrogen protoxide, and $CO_2$ breakthrough curves on a BaX zeolite exchanged to 94%.

FIG. 1 shows the simultaneous breakthrough curves for ethylene and $CO_2$ which are obtained on a 13X zeolite bed sold by the company UOP under the commercial reference APGB 8×12, that is to say a conventional 13X zeolite according to the prior art.

More specifically, the absorber containing a 25 cm bed of 13X zeolite is fed with a gas stream (nitrogen) artificially contaminated with 14 ppm of $C_2H_4$ ($C_2H_4$ input curve) and 450 ppm of $CO_2$ ($CO_2$ input curve) at a temperature of 20° C., at an adsorption pressure of 6 bar absolute and at a flow rate of 8.75 $Sm^3/h$.

FIG. 1 shows that the ethylene breakthrough ($C_2H_4$ output curve) occurs well before the $CO_2$ breakthrough ($CO_2$ output curve), accentuated by the fact that the ethylene is expelled from the adsorption sites by the $CO_2$, by a coadsorption phenomenon unfavourable to $C_2H_4$.

Similarly, FIG. 2 shows the nitrogen protoxide ($N_2O$) breakthrough curve on an industrial air purification unit located upstream of a plant for separating air by cryogenic distillation i.e. an ASU (Air Separation Unit).

The breakthrough curve was established between one evening at 8.52 p.m. and the following morning at 7.40 a.m.

The absorbent used here comprises a bed of "procatalysed"-type alumina which is followed by a bed of 13X zeolites as mentioned above. The $N_2O$ measurement is taken at the outlet of the air purification adsorbers or bottles.

The air flow rate is 16,500 $Sm^3/h$, the pressure is 10 bar absolute and the temperature of the air is about 28° C.

FIG. 2 clearly shows that, in an industrial air purification unit provided conventionally with activated alumina and with 13X sieve, the $N_2O$ breakthrough at each cycle is very significant, whereas no $CO_2$ breakthrough is measured.

In the light of FIGS. 1 and 2, it may thus be readily understood that conventional adsorbents consisting of only 13X zeolite or a composite bed of 13X zeolite preceded by activated alumina do not allow the $C_2H_4$ and $N_2O$ impurities contained in a gas stream to be effectively stopped.

In contrast, a gas purification process according to the present invention is particularly effective for removing, by adsorption, not only $C_2H_4$ and $N_2O$ impurities but also $C_3H_8$, $CO_2$ and/or water vapour impurities contained in a gas stream, particularly in an air stream.

To demonstrate this effectiveness of a process according to the invention, the adsorption device shown schematically in FIG. 3 was used.

This comprises two adsorbers or adsorption bottles 11 and 12 operating in parallel in a TSA cycle.

These adsorbers are fed alternatively with compressed air via a feed inlet 13.

The compressed air is then sent, via gas lines, to the inlet of one of the adsorbers, 11 or 12, where it is brought successively into contact with a first bed of activated alumina (AA) particles and a second bed of barium-exchanged zeolite (BaX) particles so as to adsorb the impurities contained in the gas stream on the said adsorbent particles.

The purified air is recovered and then sent, via the line 14, to, for example, a cryogenic distillation unit, in order to be distilled therein, so as to produce nitrogen, oxygen and/or argon.

The adsorber 11 or 12 which is not in the production phase is in the regeneration phase.

During this regeneration phase a regeneration gas, for example waste nitrogen coming from a cryogenic distillation column of an ASU, is heated and then introduced as a countercurrent, via the line 15, into the adsorber to be regenerated, in order to desorb the impurities retained by the adsorbent, before being discharged to the atmosphere via a venting line 16.

The entire device is controlled by solenoid valves 1 to 10.

In the present case, the zeolite (BaX) used is an X zeolite exchanged to approximately 94% with barium cations, i.e. an X zeolite in which 94% of the exchangeable sites are occupied by barium cations, the other sites (6%) being occupied by sodium and/or potassium cations.

The adsorption is carried out under the same operating conditions as those in FIG. 1 and the results obtained are plotted in FIG. 4, which shows the propane ($C_3H_8$), ethylene ($C_2H_4$), nitrogen protoxide ($N_2O$) and $CO_2$ breakthrough curves on the BaX exchanged to 94%.

The operating conditions under which the tests (the results of which are plotted in FIG. 4) were carried out at a pressure of 6 bar, a temperature of 18° C. and a flow rate of 8.72 $Sm^3/h$ of a stream of nitrogen ($N_2$) artificially contaminated by 400 ppm of $CO_2$ and approximately 1.5 ppm of $N_2O$, CnHm and $C_3H_n$.

In FIG. 4, curve C1 shows the $CO_2$ content at the inlet, curve C2 shows the $CO_2$ content at the outlet, curve C3 shows the $N_2O$ content at the outlet, curve C4 shows the $C_2H_4$ content at the outlet and curve C5 shows the $C_3H_8$ content at the outlet of the adsorbent bed, as a function of the elapsed time (in minutes).

It may be seen that, in the case of a BaX, according to the invention, the 1.5 ppm ethylene and propane breakthroughs occur well after the $CO_2$ breakthrough, whereas the order of the breakthroughs was reversed on the 13X (cf. FIG. 1).

In other words, a BaX zeolite exchanged to 94% with barium has, surprisingly, an affinity for propane, ethylene and nitrogen protoxide which is much greater than that of a 13X zeolite (cf. FIG. 1 or 2) and, even so, maintains a high $CO_2$ adsorptivity since the $N_2O$, $C_2H_4$ and $C_3H_8$ break through after the $CO_2$, whereas in the case of a conventional 13X the $N_2O$, $C_2H_4$ and $C_3H_8$ break through well before the $CO_2$.

In fact, it is clearly apparent that the 13X zeolite is insufficient for stopping propane, ethylene and nitrogen protoxide, whereas the BaX zeolite has many advantages:

large pore diameter, allowing it to stop a large number of impurities (butane, cyclohexane, etc.) such as the 13X;

high propane and ethylene adsorptivity;

nitrogen protoxide breakthrough time identical to the $CO_2$ breakthrough.

Apart from BaX, the advantage of the following zeolites may also be noted: A, Faujasite, ZSM-18, Mordenite, Gmelinite, ZSM-12, Boggsite, Heulandite, Offretite, Cancrinite, Linde Type L, Stilbite, EMT, Mazzite. These zeolites are aluminosilicates with wide pores similar to 13X. Their propane, ethylene and nitrogen protoxide adsorptivity may be particularly high after cation exchange with one or more cations of Group IIA of the Periodic Table of the Elements ($Mg^{2+}$, $Ca^{2+}Sr^{2+}Ba^{2+}$)

The present invention relates especially to a process for purifying air ($H_2O$, $CO_2$, hydrocarbons, particularly including propane and ethylene, as well as nitrogen protoxide $N_2O$, etc.) by TSA or PSA of a cryogenic air separation unit.

The use of the BaX zeolite makes it possible to reduce the impurities in the distillation column. A prepurification with BaX therefore protects the ASU from risks caused by propane, ethylene and nitrogen protoxide, while allowing effective removal of the $CO_2$.

What is claimed is:

1. Process for purifying an air stream containing propane, nitrogen protoxide, ethylene, and carbon dioxide as impurities, comprising the steps of:
   (a) bringing the air stream to be purified into contact with at least one barium-exchanged adsorbent comprising at least one X zeolite adsorbent having a Si/Al ratio ranging between 1 and 1.25, a pore size ranging between 4 and 10 Å and containing from 10 to 98% of barium cations and from 2 to 90% of at least one of sodium and potassium cations, the sum of the barium, potassium and sodium cations present in the zeolite representing at least 50% of all of exchangeable cations; and
   (b) simultaneously adsorbing carbon dioxide, propane, nitrogen protoxide and ethylene on said barium-exchanged adsorbent.

2. The process according to claim 1, wherein the X zeolite contains at least 30% of barium cations.

3. The process according to claim 1, wherein the X zeolite has a pore size between 5 and 8 Å.

4. The process according to claim 1, wherein the zeolite furthermore contains at least one cation of Group IA or IIA.

5. The process according to claim 1, wherein the zeolite has a Si/Al ratio ranging between 1 and 1.15.

6. The process according to claim 1, wherein the X zeolite contains from 75 to 98% of barium cations.

7. The process according to claim 1, wherein the air stream further contains water vapor, and said water vapor is adsorbed on the X zeolite containing barium cations.

8. The process according to claim 1, wherein the air stream is at a temperature ranging between −40° C. and +80° C.

9. The process according to claim 1, wherein the adsorption pressure ranges between 3 bar and 40 bar.

10. The process according to claim 1, wherein the desorption pressure ranges between 0.5 bar and 6 bar.

11. The process according to claim 1, wherein the flow rate of the gas stream ranges between 1 and $10^6$ Sm$^3$/h.

12. The process according to claim 1, wherein said process is a PSA or TSA process.

13. The process according to claim 1, further comprising regenerating the barium-exchanged adsorbent with a gas having a regeneration temperature ranging between 80° C. and 400° C.

14. The process according to claim 1, wherein at least a portion of the air stream stripped of the impurities is subjected to at least one cryogenic distillation step.

15. The process according to claim 1, wherein the adsorbent contains at least 70% barium cations.

16. The process according to claim 1, wherein the zeolite has a Si/Al ratio of about 1.

17. The process according to claim 1, wherein the zeolite contains from 70 to 96% of barium cations, the rest of the exchangeable sites being occupied by at least one of sodium and potassium cations.

* * * * *